July 7, 1970  S. SAUL  3,519,149
OVER HEIGHT LOAD PROTECTION FOR AUTOMATIC STORAGE SYSTEM
Filed March 7, 1968  7 Sheets-Sheet 1

INVENTOR.
SANFORD SAUL
BY
Baldwin, Egan, Walling & Fetzer
ATTORNEYS

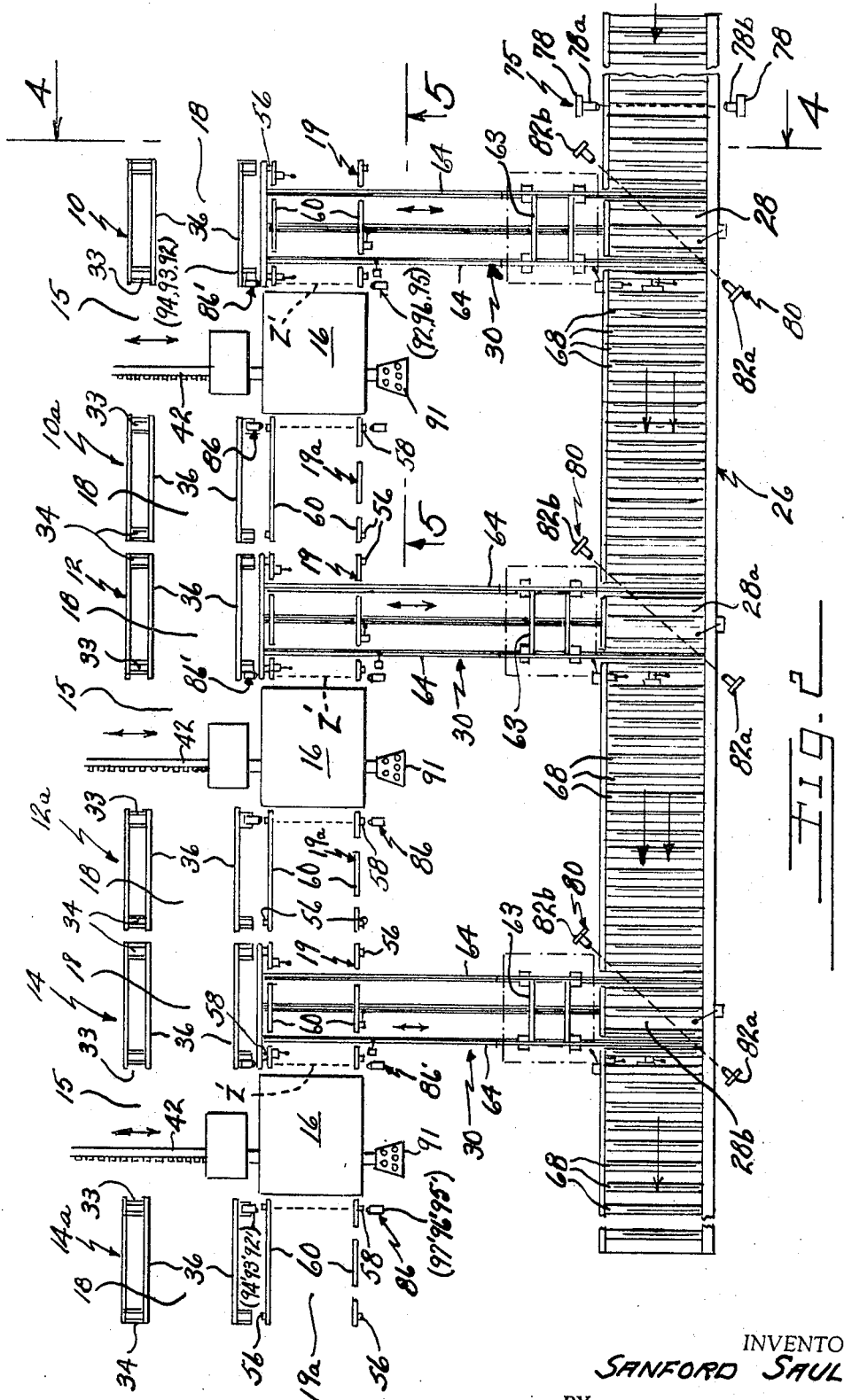

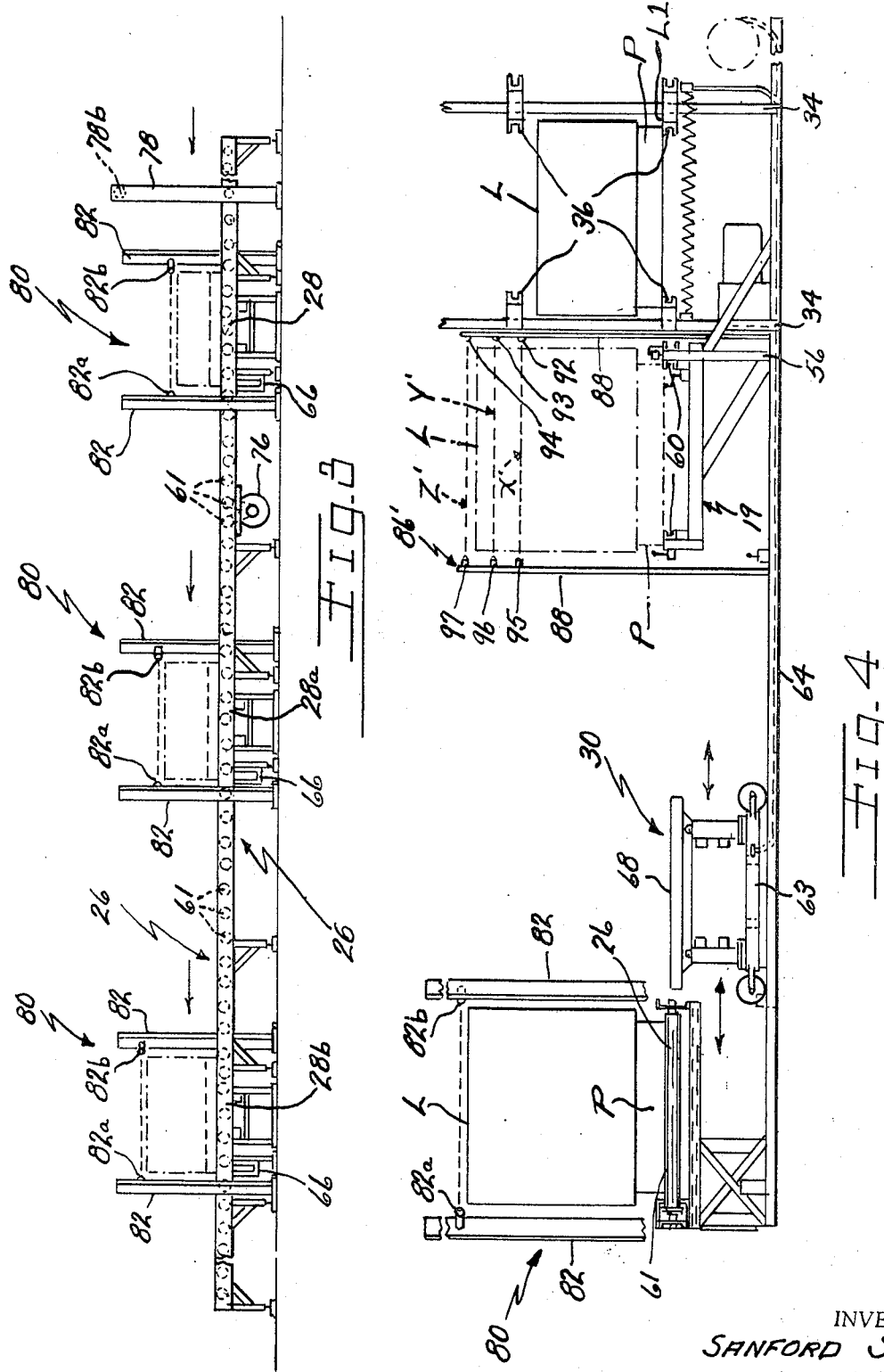

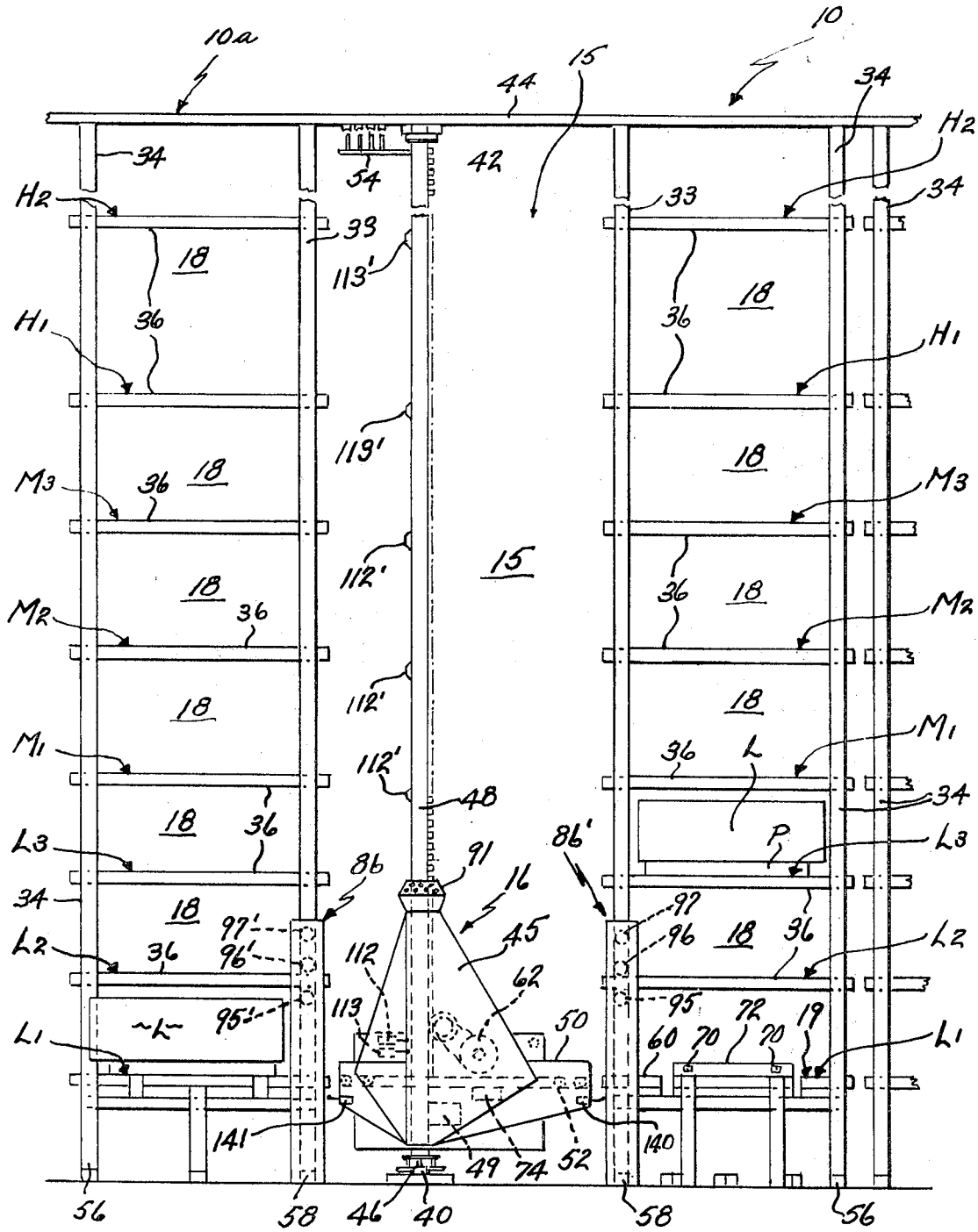

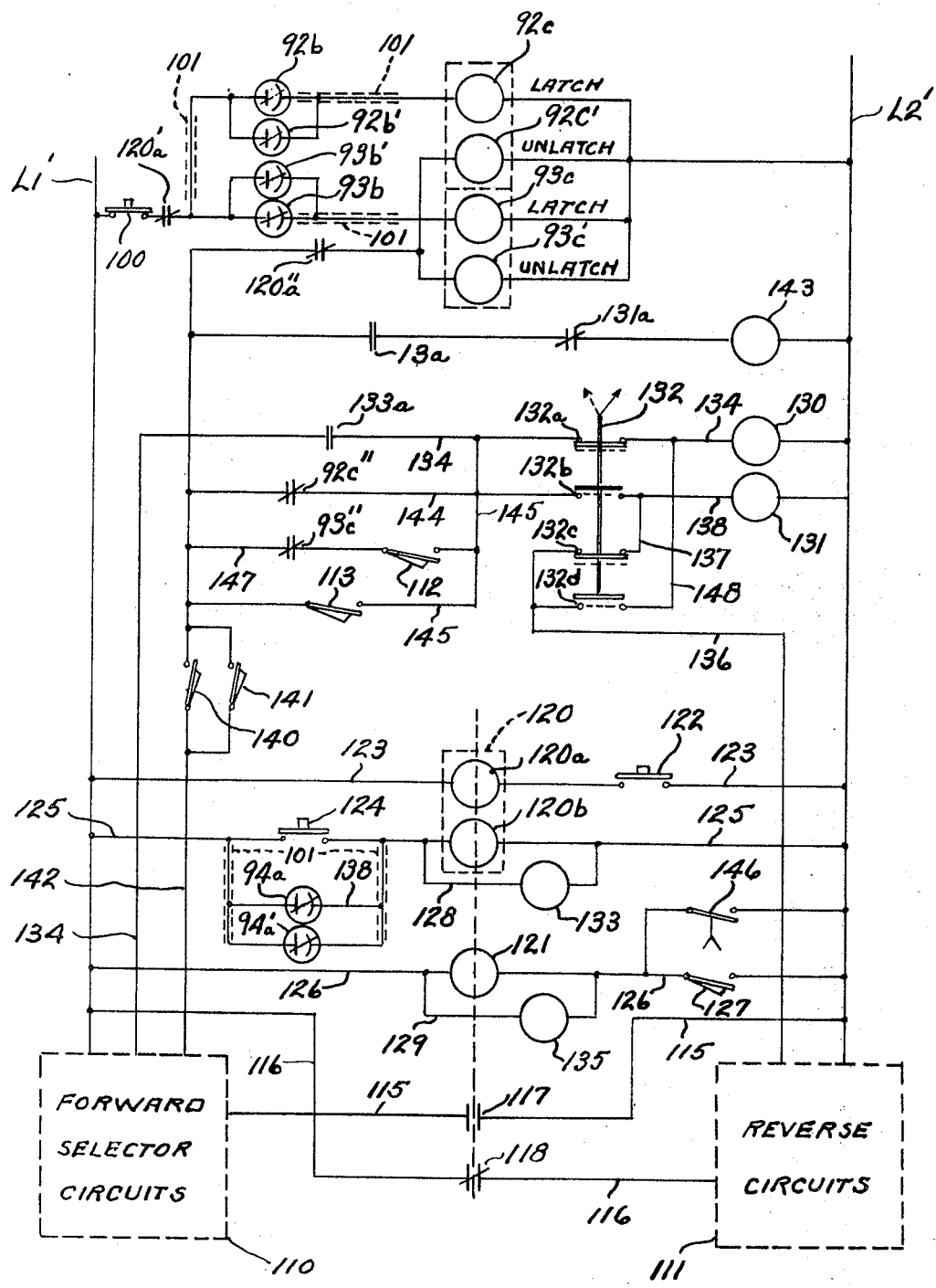

United States Patent Office 3,519,149
Patented July 7, 1970

3,519,149
OVER HEIGHT LOAD PROTECTION FOR
AUTOMATIC STORAGE SYSTEM
Sanford Saul, Cleveland, Ohio, assignor to The Triax
Company, Cleveland, Ohio, a corporation of Ohio
Filed Mar. 7, 1968, Ser. No. 711,428
Int. Cl. B65g 1/00
U.S. Cl. 214—16.4                                    12 Claims

ABSTRACT OF THE DISCLOSURE

A mechanized remotely controlled transfer apparatus having conveyor mechanism for moving a load to a selected pick-up and discharge station disposed adjacent a storage frame of an automatic warehousing system, with the system having a mechanized load carrier for depositing loads at selected locations in the storage frame for storage of the loads, and for returning loads from the storage frame back to the pick-up and discharge station and thence back to the conveyor mechanism, for further rehandling of the loads. The transfer apparatus includes a main conveyor line means and spur conveyor line means extending from the main conveyor line means. At least one transfer station is provided on the main conveyor at the juncture between the main and spur conveyor means. The spur conveyor means includes a transfer cart movable on tracks between the transfer station on the main conveyor and the associated pickup and discharge station adjacent the storage frame, with such cart having elevatable means thereon so as to lift a load from or deposit a load at either of said stations. Photoelectric sensing means are provided for checking the maximum height of a load on the main conveyor entering the system, and other photoelectric sensing means are provided for checking the maximum load heights at each transfer station on the main conveyor, prior to movement of the load on the spur conveyors to the respective pick-up and discharge station disposed adjacent the storage frame. If the photoelectric sensing means indicates that the incoming load on the conveyor means is over-height for the size of the storage bins in the storage frame to which the load is being directed for storage, the photoelectric sensing means automatically stops the conveyor means and prevents further movement of the load toward the pickup and discharge station. Photoelectric sensing means are also located at the pickup and discharge stations, for sensing the height of loads removed from the respective pickup and discharge station by the mechanized load carrier for transference to a selected storage opening in the storage frame, for preventing loads exceeding predetermined sizes from being attempted to be deposited in storage openings which have not been designated to receive them.

---

This invention relates in general to transfer mechanism for transferring loads to and from a mechanized storage system, and more particularly to an automatic transfer apparatus of the type adapted for transferring loads from conveyor mechanism to a pick-up and discharge station disposed adjacent the storage frame of the warehousing system, and vice versa in removing loads from the warehousing system, and including sensing means coacting with the system for checking the height of the loads being transferred by the system and for preventing over-height loads from being moved into the system.

In U.S. Pat. 3,182,823 issued May 11, 1965, to Anthony R. Chasar and entitled "Transfer Equipment" there is disclosed a transfer mechanism of the general type of the present transfer system. Such patent discloses a transfer apparatus including a load handling conveyor system for delivering loads to be stored in a storage frame of a plural storage system, with the transfer apparatus including a main conveyor and spur conveyors extending from the main conveyor, with the spur conveyors each including a transfer cart movable in a controlled path between a transfer station disposed at the main conveyor and a pick-up and discharge station disposed adjacent the storage frame, for transferring a load from the conveyor station to the pick-up and discharge station.

The present invention provides a transfer apparatus of the above-discussed type which includes sensing means for sensing the height of a load on the main conveyor entering the system, together with sensing means associated with the transfer stations on the main conveyor for sensing the load heights of loads to be transferred to the spur conveyors leading to the individual pick-up and discharge stations disposed adjacent the respective storage frame areas. Associated with each of the load carriers in the plural storage system is a pair of pick-up and discharge stations (each of which is hereafter referred to as a P and D station) including a left-hand P and D station and a right-hand P and D station. The right-hand P and D station associated with each load carrier is connected by means of a respective of the aforementioned spur conveyor means to the main conveyor. The left-hand P and D station associated with each load carrier mechanism is adapted to be serviced by, for instance, an overhead crane or some other type of material handling mechanism. Associated with each of the right-hand and left-hand P and D stations for each storage frame aisle are photoelectric sensing means which will sense the height of the load positioned at the respective P and D station for handling by the associated load carrier in connection with depositing the load in a selected storage opening of predetermined height in the storage frame and will automatically check the maximum height of the load as well as the selected load height, for proper handling by the load carrier as determined by the programming of the load carrier. In the event that the height of the load is greater than the height of the storage opening to which such load has been programmed to, the load carrier will automatically return the over-height load for removal from the system.

Accordingly, an object of the invention is to provide a novel transfer load handling and storage system which includes means for sensing the height of loads being handled by the system.

Another object of the invention is to provide a novel load handling and storage system which includes a main conveyor for moving loads into the system and auxiliary spur conveyors for taking loads from the main conveyor and depositing them on pick-up and discharge stations disposed adjacent the storage frame area of the system, and vice versa, and which includes sensing means for checking the height of loads being transferred into the system.

Another object of the invention is to provide a novel load handling and storage system which includes a plurality of storage areas serviced by automatic mechanized load carrier mechanisms, and with a pick-up and discharge station being disposed adjacent each of the storage frame areas of the system, and wherein a main conveyor means and spur conveyor means are provided for transferring loads into the system for subsequent handling by the associated load carrier mechanism, and wherein photoelectric sensing means is provided for sensing the maximum height of the load being handled by the main conveyor means and for sensing the height of the load which is being handled by each of the spur conveyors of the system, and for sensing the height of the load at each pick-up and discharge station as the respective load carrier mechanism moves the load from the rsepective P and D station onto the load carrier mechanism for depositing the load in a selected storage opening in the storage frame.

A still further object of the invention to to provide a novel load handling and storage apparatus in accordance with the above wherein the sensing means comprises photoelectric cells coupled into the control circuitry of the sysem for automatically controlling the movement of the loads into the system and controlling the movement of the loads to the individual pick-up and discharge stations in the system, and for stopping such load movement in the event that the load is an over-height load moving into a storage area having the wrong size of storage bin openings for that particular size of load.

Other objects and advantages of the invention will be apparent from the following description taken in conjunction with the accompanying drawings wherein:

FIG. 2 is an enlarged plan view of the plural transfer mechanisms and plural storage frame areas shown in FIG. 1;

FIG. 3 is a front elevation of the main conveyor of FIGS. 1 and 2 and illustrating the transfer stations and associated sensing mechanisms associated with the main conveyor and the transfer stations;

FIG. 4 is a partial section of one of the spur transfer mechanisms as taken generally along the plane of line 4—4 of FIG. 2 looking in the direction of the arrows;

FIG. 5 is a front elevation of one of the mechanized load carriers and associated storage frame assembly, as taken generally along the plane of line 5—5 of FIG. 2 looking in the direction of the arrows and illustrating the positions of the sensing means associated with the left-hand and right-hand pick-up and discharge stations of the associated storage frame area;

Figure 6:
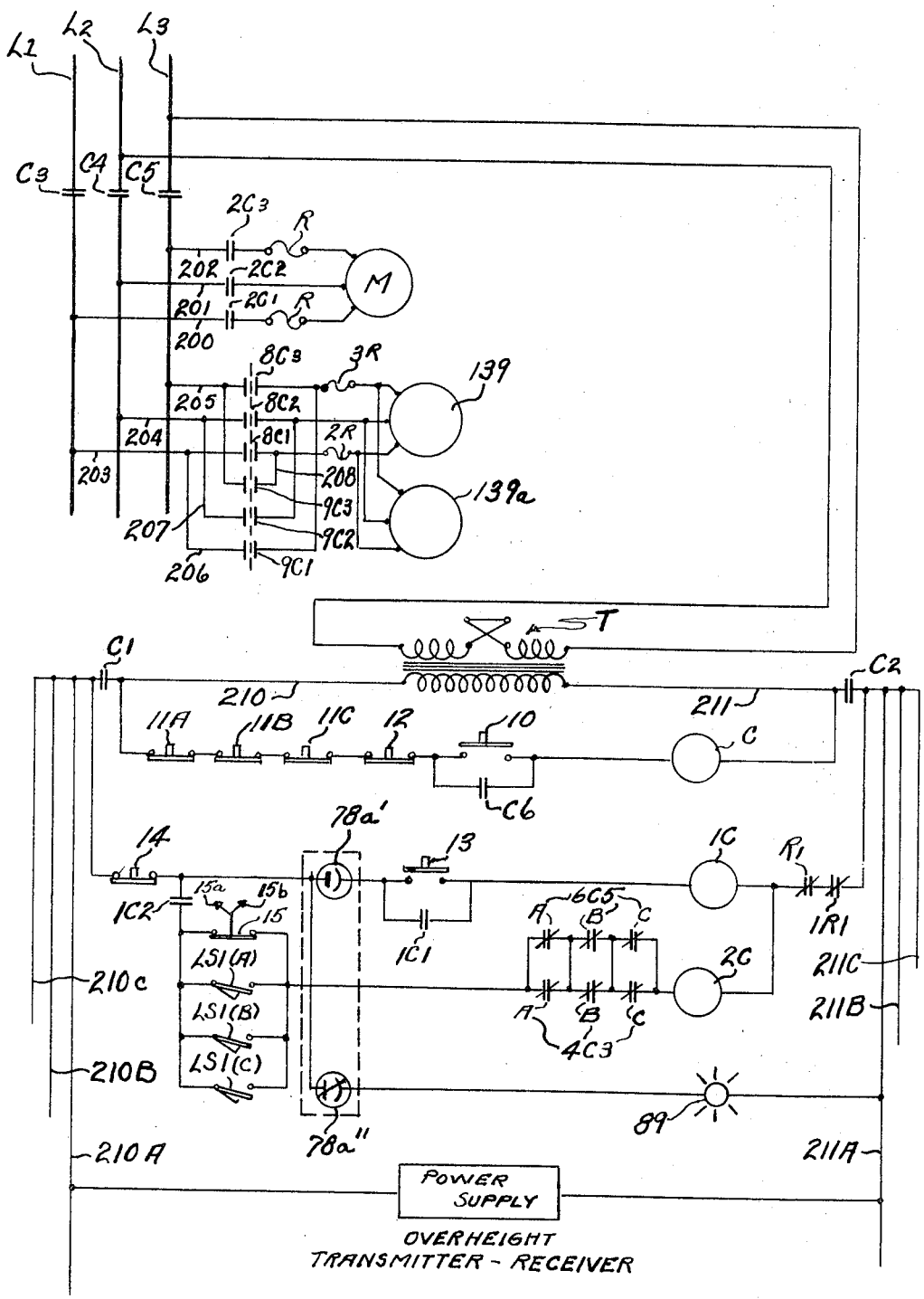
Figure 7:
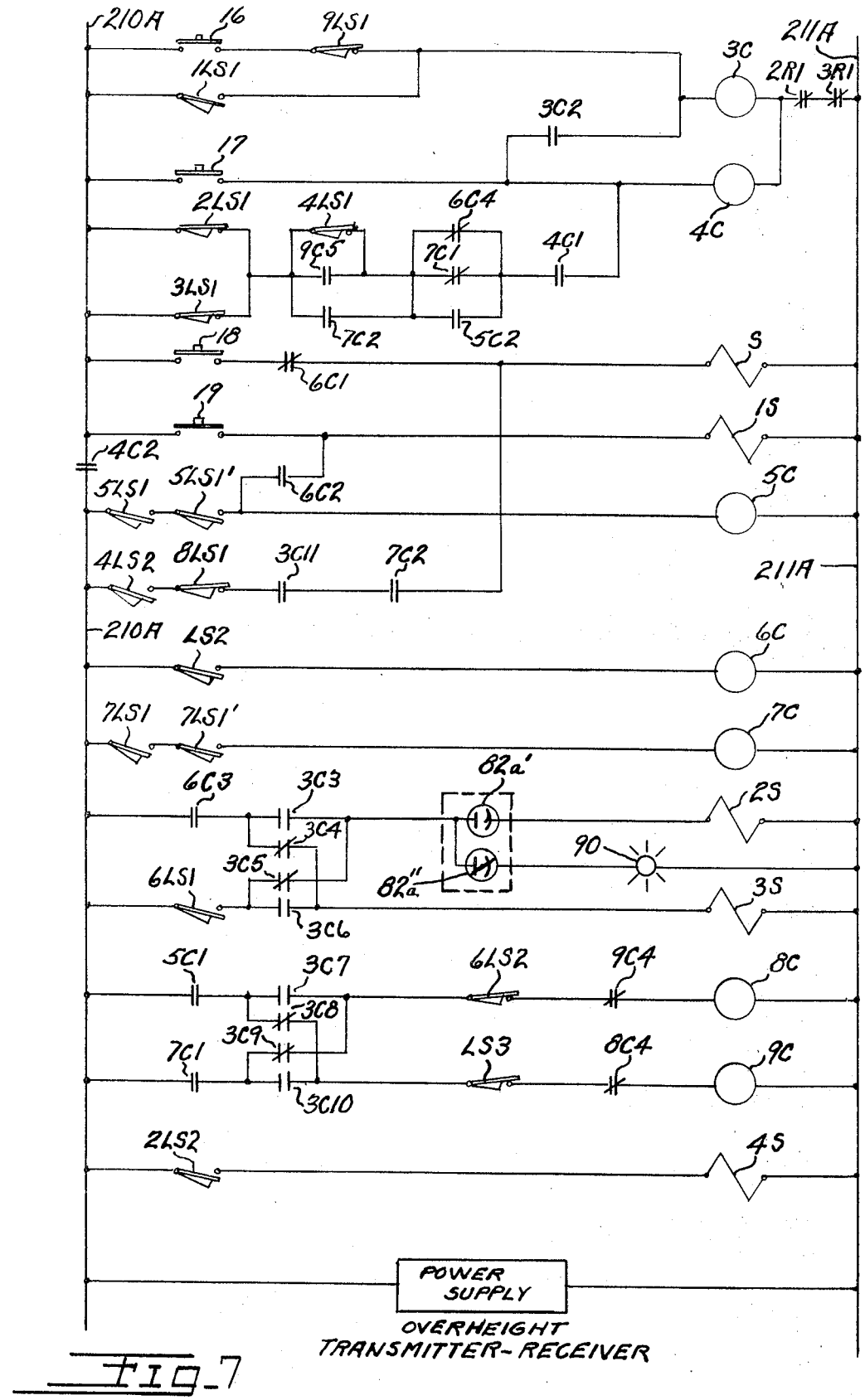

FIGS. 6 and 7 illustrate schematically electrical control circuitry for controlling and operating the transfer apparatus of the invention and including the sensing means for automatically controlling the maximum height of loads moving on the main conveyor into the system, and the sensing means at each transfer station on the main conveyor for sensing the load height at the respective transfer station for determining if the load height is proper for the maximum height of storage bins in the storage area serviced by the spur transfer mechanism extending between the respective transfer station and pick-up and discharge station of the respective storage areas;

FIG. 8 is a schematic illustration of control circuitry including the sensing means at the respective P and D station, for sensing the height of load being moved from the P and D station onto the associated load carrier and for controlling the operation of the load carrier in its programmed movement of depositing loads in the associated storage frame sections of the system.

Figure 1:
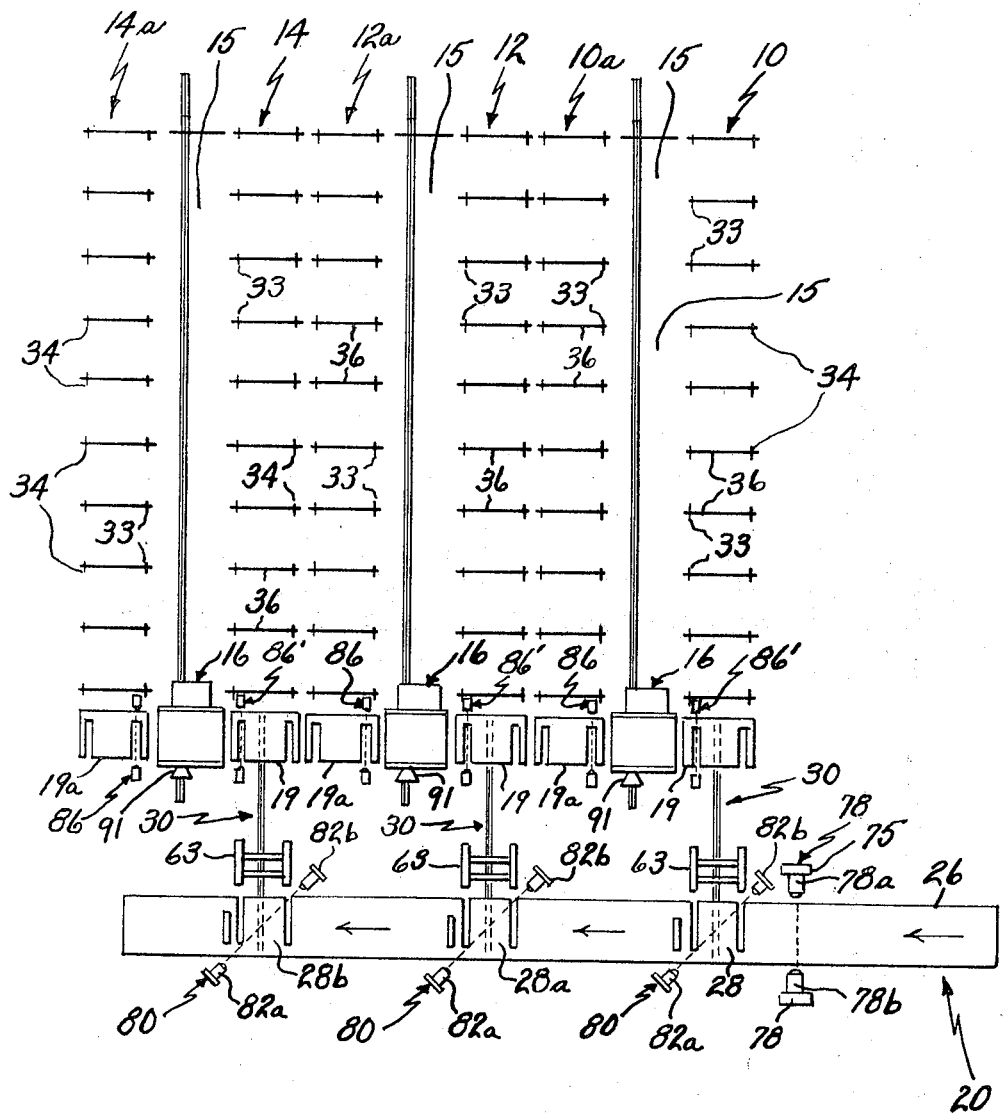
FIG. 1 is a schematic plan illustration of a warehousing system incorporating a plurality of the transfer mechanisms for servicing a plural storage area system, and diagrammatically illustrating the position of the sensing means associated with each transfer mechanism and each storage frame area.

The storage system herein illustrated comprises a plurality of pairs of elongated storage frames 10, 10a, 12, 12a, 14, 14a, and so on, having an aisle or travel zone 15 disposed between each pair, and along which a mechanized load carrier apparatus referred to generally by reference number 16, is adapted to travel. Each storage frame may comprise a plurality of horizontally and vertically disposed bins or compartments 18 (FIGS. 1 and 5) and the load carrier is adapted to convey a load to or from any of the compartments. Reference may be had to U.S. Pat. 3,139,994 issued July 7, 1964 in the name of A. R. Chasar and entitled "Mechanical Load Handling Transfer and Storage Equipment" for a general disclosure of one type of storage frame and load carrier arrangement.

Each pair of storage frames is provided adjacent one end thereof with pick-up and discharge stations 19, 19a disposed on opposite sides of the associated aisle 15 of the respective storage frame area, so that the associated mobile load carrier mechanism can be oriented adjacent such P and D stations, and handle loads from either of said stations. The left-hand station 19a associated with each of the aisles is, in the embodiment illustrated, an auxiliary station adapted to receive loads thereon by means of some type of external load handling mechanism, while the right-hand P and D station 19 for each of the aisles is a main station adapted to receive loads thereon by means of the conveyor system 20 (FIG. 1) to be hereinafter described.

The conveyor system 20 in the embodiment illustrated includes a main conveyor mechanism 26 with such main conveyor mechanism having a plurality of transfer stations 28, 28a, 28b disposed therealong, for receiving loads being transmitted along the main conveyor 26 for entry into the storage frame. As can be best seen in FIG. 1 each of the conveyor transfer stations is disposed in opposed relation to a respective main P and D station 19. Connecting each P and D station 19 and associated transfer station on the main conveyor 26 is a spur conveyor mechanism 30 for moving loads between stations 19 and 28, 28a, 28b and as will be hereinafter described.

Referring now in particular to FIG. 5, each storage frame section may comprise an inner row of aisle posts 33 disposed adjacent the load carrier path of travel and laterally spaced outer posts 34. The aisle posts and the outer posts are aligned in rows parallel with the aisle and are laterally respectively aligned, in a manner to provide a multiplicity of storage bays. The bays are divided vertically into different levels by load supports 36 defining the aforementioned storage bins 18, each of the latter comprising a pair of the spaced support members 36, extending toward the associated aisle 15 and suitably secured to the posts 33, 34. As best seen in FIG. 5, the bins 18 may be of different heights for storage of different height loads therein. For instance, the first three levels L1, L2 and L3 may be designated for the storage of the lowest height loads. The fourth, fifth and sixth levels M1, M2 and M3 may be designated for medium height loads, while the next levels H may be designated for the higher height loads. It will be understood that the storage sections on each side of a respective aisle have the same levels of bins or storage spaces, and that each pair of storage frame sections (e.g. 10 and 10a) may have different levels are compared to the other pairs of storage frame sections (e.g. 12, 12a and 14, 14a) so that different height loads can be stored in each pair of the storage frame sections. Insertion of the selected height loads in the respective storage frame sections by the associated load carrier 16 will be hereinafter described.

The load carrier 16, in the embodiment illustrated, moves along the associated aisle on a base track 40 (FIG. 5) and an overhead track 42. Overhead track 42 may be mounted on cross beam members 44 connecting the right and left-hand storage frames. The load carrier 16 may comprise a base carriage 45 having wheels 46 which roll along the base track. The load carrier may also include a vertical mast 48 extending upwardly from carriage 45, and a vertically movable elevator 50 is adapted for movement up and down the mast for transferring a load to the selected level in the selected bay of the storage frame.

The vertically movable elevator 50 may carry a laterally movable extensible platform or extractor 52 for moving into the selected storage bin for either depositing a load therein or removing a load therefrom. The load carrier is preferably powered by electric motor means for carrying out the various movements of the components of the load carrier, including motor 49 for the horizontal movement of the base carriage 45 and associated mast structure 48, the motor 62 for the vertical movement of the elevator 50, and the motor 74 for the lateral movement of the extractor mechanism 52. The upper end of the mast of the load carrier may carry means 54 for supplying current to the aforementioned motor means.

Referring again to FIGS. 2 and 4 the pick-up and discharge stations 19, 19a may comprise outer and inner posts 56, 58 connected by lateral support members 60 which are adapted to support a load thereon and provide for the entry of the extractor of the load carrier between the members 60 for either removing a load L from the respective P and D station or depositing a load thereon. The P and D station 19a provides means for separately delivering a load to or removing it from the storage frame without utilizing the spur conveyor mechanisms 30. In the embodiment illustrated the supports 60 of auxiliary P and D stations 19a are so arranged that conventional mobile lift trucks can be used to service the auxiliary P and D stations.

Each of the spur conveyors 30 in the embodiment illustrated, comprises a mobile transfer cart 63 (FIG. 4) mounted on a pair of spaced parallel rails 64 positioned upon a common base with the main conveyor 26 and the storage frames, and extending from beneath the main P and D station 19 to beneath the associated transfer station on conveyor 26. Cart 62 may be driven on rails 24 by any suitable means, such as for instance the power-driven drive chain illustrated and described in aforementioned Pat. 3,182,823, and reference may be had to the latter patent for a complete description of suitable structure and operation for the spur transfer conveyor mechanism.

The conveyor 26 may be of power-driven roller construction, and adjacent each transfer station 28, 28a, 28b thereof, the conveyor 26 may be provided with a vertically extending load stop 66 (FIG. 3) which may project upwardly from a housing mounted beneath the rollers 61 of the conveyor 26. The load stop is preferably solenoid operated to move upwardly and downwardly and to be positioned between a pair of adjacent conveyor rollers. The uppermost edge of the load stop is adapted to be disposed below the upper level of the rollers when in a retracted position and is adapted to extend upwardly a substantial distance thereabove in the extended position of the load stop. The purpose of the load stop is to stop a load moving along the conveyor 26 at a selected conveyor transfer station, from which point it can be subsequently transferred by the cart 63 of the spur conveyor mechanism to an associated P and D station 19. Reference may be had to aforementioned Pat. 3,182,823 for a more detailed discussion of the load stop mechanism and its coaction with conveyor 26 and transfer mechanism 30.

In the general operation of the transfer mechanism 30, a transfer cart 63 is positioned at an associated conveyor transfer station 28, 28a or 28b beneath a load held by the load stop. The cart is of an elevatable type as disclosed in Pat. 3,182,823, and when the cart is raised, the load is lifted off the conveyor 26, and then the cart is moved along the rails 64 into the associated P and D station 19. The support structure 68 (FIG. 4) on the cart is then lowered, thereby leaving the load at the P and D station, after which the transfer cart may be moved back to the conveyor 26. It will be understood that a transfer cart may also be readily used to pick up a load from the associated P and D station and move the same onto the conveyor 26.

The extent of movement of a transfer cart in the direction of the associated P and D station is preferably regulated whereby the cart moves into the associated P and D station slightly further than is necessary to position its load at said station. This causes the pallet P supporting the associated load L to strike the rollers 70 (FIG. 5) on back-up plate 72 a moment before the cart stops its movement, thereby assuring that the load will be positioned firmy against the rollers and properly squared with the associated P and D station. This places the load in optimum position to be picked up by an associated load carrier mechanism 16 for storage in a selected bin of the storage frame assembly.

In accordance with the present invention, there is provided sensing means 75 (FIGS. 1 and 2) upstream from the transfer stations for checking the maximum height of loads as they move along the conveyor 26, and in the event that a load is higher than the predetermined maximum, the sensing means actuates controls cutting off the power to the conveyor motor (e.g. 76—FIG. 3) and stops the operation thereof until such time as the oversize or over-height load is removed from the conveyor, after which the warehousing operator restarts the conveyor mechanism 26. In the embodiment illustrated said sensing means is in the form of a support 78 associated with the conveyor frame, with a photoelectric cell and a light source 78a and 78b respectively, mounted thereon, for checking the maximum height of a load passing along the main conveyor. If the beam of light is broken by an over-height load, the photocell causes deenergization of the conveyor, as will be hereinafter described in detail.

Also, associated with each of the conveyor transfer stations 28, 28a or 28b are sensing means 80 (FIGS. 3 and 4) for checking the load height at the conveyor transfer station at which a load has been positioned for subsequent movement by the associated spur conveyor mechanism to the associated P and D station of the storage area, for handling by the load carrier 16 into a selected bin of the associated storage frame section. In the embodiment illustrated said sensing means 80 comprises supports 82 (FIG. 4) mounting a respective photoelectric cell 82a, and associated light source 82b which check on the maximum height of the load at each of the conveyor transfer stations. It will be understood that the elevation of the photoelectric sensors above the level of the conveyor 26 at the conveyor transfer stations will be less than the elevation of the upstream sensor 75 above the conveyor, and as illustrated for instance in FIG. 3. Thus a check is made at each of the conveyor transfer stations to insure that the load being moved to a respective P and D station is of the correct height for the maximum height of the storage bins in the respective storage frame section. As best seen in FIG. 3, the height of the sensors above the level of the conveyor at the transfer stations may vary, thus indicating that the height of the bins in one storage section may vary with respect to the bin heights in the other storage frame sections.

The aforementioned auxiliary pickup and discharge stations 19a disposed on the left-hand side of the respective load carrier and the main P and D stations 19 disposed on the right-hand side of the respective load carrier, also may have a maximum load height and selective load height sensors 86, 86' (FIGS. 2 and 4) associated therewith for checking the height of the loads deposited thereon and then subseqently removed therefrom by the load carrier mechanism for transfer into the associated storage area. In the embodiment illustrated said sensing mechanism 86, 86' comprise supports 88 mounting photoelectric sensors 94, 94' and associated light sources 97, 97' on the supports, for checking the maximum load height of a load deposited on the associated P and D station as well as photoelectric sensors 92, 93, 92', 93' and associated light sources 95, 96, 95' and 96' for checking the selective load height for the load to be moved into a selected height of storage bin in the respective pair of storage frame sections. The load height sensors 86, 86' for each pair of storage frame sections may be of different heights above the level of the respective P and D station supports 60 for providing for the sensing and storage of different heights of loads in each pair of storage frame sections as compared to the heights of loads stored in the other pairs of storage frame sections.

Referring now to the circuitry illustrated in FIGS. 6, 7 and 8, the aforementioned sensors 75, 80, 86 and 86' are coupled into the circuit of the system for controlling the operation of the load handling and storage mechanism, so that in the event an oversized load is attempted to be stored by the mechanism or attempted to be moved into the system, the sensing means will sense the over-height load and cause stoppage of the system until the oversized load is removed therefrom or otherwise handled, after which the system may be re-energized for moving other loads into the system. FIG. 6 corresponds in general to FIG. 15 of aforementioned U.S. Pat. 3,182,823. The line containing the conveyor start switch 13 has included therein, a normally open contact 78a' of photocell 78a of sensor mechanism 75 sensing the maximum height of load entering the system on conveyor 26. Also a line is provided which contains a normally closed contact 78a'' of the photocell sensor 78a and also a pilot light 89, with such line being connected into line 211A. Aforementioned photocell contact 78a' is maintained closed by a beam of light from light source 78b of the sensor 75 while the photocell contact 78a'' is maintained open by such light beam. However, in the event that an oversized load moving along conveyor 26 breaks the light beam, then photocell contact 78a' will open and photocell contact 78a'' will close. Opening of photocell contact 78a' interrupts the circuit to coil 1c thereby causing opening of contacts 1c2 and deenergization of coil 2c. Deenergization of coil 2c causes opening of contacts 2c1, 2c2 and 2c3 (FIG. 6) to stop the conveyor motor 76 thus preventing further movement of loads into the system until such oversized load is removed to thus permit re-establishcent of the light beam from light source 78b and reclosing of photocell contact 78a' and opening of photocell contact 78a''. It will be seen that upon interruption of the light beam and closing of photocell contact 78a'', a circuit is completed to the pilot light 89 and the latter lights up to indicate to an operator that an oversize load has been sensed by the sensor-mechanism 75 and that the conveyor 26 has been shut down.

Referring now to FIG. 7, there is shown control circuitry which is generally similar to the control circuitry illustrated in FIG. 15A of aforementioned U.S. Pat. 3,182,823, except that in the line containing the solenoid coil 2s which, as described in U.S. Pat. 3,182,823, is operative to raise the load stop mechanism 66 (FIG. 3) associated with each conveyor transfer station 28, 28a or 28b, there is located the photoelectric contacts 82a' and 82a'' of photoelectric cell 82a of the sensing means 80 at the associated transfer station 28 on the conveyor 26. Contacts 82a' are normally open contacts and are maintained closed by the light beam from the respective light source 82b of the sensing means 80. It will be seen, therefore, that if a load positioned at transfer station 28 is of such over height as to cause interruption of the associated light beam, then contact 82a' will open and will prevent energization of solenoid coil 2s, thereby preventing actuation of the valve means which directs fluid to the cylinder and piston motors of the associated cart 63 for raising the load support bars 68 of the transfer cart to their uppermost position for lifting the load off the transfer station. Normally closed photoelectric contact 82a'' is maintained open by the beam of light from light source 82b and, in the event of interruption of the light beam as above described, then contact 82a'' closes thereby placing in circuit the pilot light 90 indicating to an operator that a load that is oversized for storage in the bins of the associated storage frame section, is positioned at the transfer station 28.

In order to clear such oversized load from the transfer station 28, the operator may press pushbutton 19' (FIG. 7) in the line containing the 1s solenoid coil which controls the lowering of the stop mechanism 66 associated with each transfer station. This causes lowering of the stop and thus opening of the contact 1LS1 (FIG. 7). Opening of contact 1LS1 causes deenergization of coils 3c and 4c, thereby permitting the contacts 4C3 (FIG. 6) to reclose resulting in energization of coil 2c to cause restarting of the conveyor motor 76. Conveyor 26 then moves the load away from the transfer station 28 and on down toward the next transfer station which is associated with bins in its associated storage frame section which may be adapted to receive that height of load. Other than the above, the operation of the transfer conveyor mechanisms may be as described in the aforementioned U.S. Pat. 3,182,823 and, therefore, will not be repeated here, it being understood that so long as the load height does not break the light beam of the sensing mechanism 80 at the respective transfer station, it will be received by the associated transfer cart in its operation of "loading in" a load from the conveyor to its associated P and D station. If the load does not interrupt the light beam, then the cart raises the load from the conveyor and moves it to the associated P and D station and places it on the latter. Thereafter the transfer cart moves outwardly from the P and D station and travels back to its associated conveyor transfer station.

When a load is positioned at its respective P and D station, such load is adapted to be handled by the load carrier mechanism 16 and moved to a selected bin location in the associated storage frames. Referring now to FIG. 8, there is illustrated circuitry which is somewhat similar to that shown in FIG. 6 of U.S. Pat 3,219,207 issued Nov. 23, 1965, to A. R. Chasar.

As described in U.S. Pat. 3,219,207, upon actuation of the proper selector switches on for instance control console 91 (FIGS. 2 and 5) of the load carrier, sequential circuits to the drive motors 62 and 74 of the load carrier cause the vertically movable elevator 50 to move upwardly into alignment with the support members 60 of the P and D stations 19 and 19a and then cause the extractor 52 to move laterally into the selected P and D station. The extractor may then be raised to lift the load off the P and D station whereupon the above movements of the extractor and vertically movable elevator are reversed and the carrier returns to the start position. Meanwhile a predetermined load support bin 18 of proper height has been selected by the warehousing operator (or some other transmitting mechanism) by means of for instance selector switches on the console 91, for determing to which bin the load is going to be deposited.

Sequential circuits to all of the motors then cause the following to happen: The load carrier moves horizontally along the aisle to a selected row of load support means and the elevator moves to the selected level, and then the extractor moves into the selected support means in the selected storage frame section and then lowers to deposit the load on the associated rails 36 and then the extractor returns back into the elevator, and then the load carrier may return back along the aisle to its start position adjacent to the P and D station. The circuits for moving the load carrier in one direction to a P and D station or to a selected load support means in the storage frames are referred to as forward selector circuits 110 (FIG. 8) and other circuits provided for returning the carrier to the start position from a P and D station or from a selected load support means are referred to as reverse circuits 111.

Assume now that there is a load at P and D station 19 for transference to one of the associated pair of storage frame sections 10, 10a, and that the load carrier is positioned at the start position between the P and D stations 19, 19a wih the extractor 52 on the vertically movable elevator 50 disposed a little below the load supporting channel members of the P and D stations. The extractor direction selector switch 132 may be positioned for energizing the coil 130 in order to cause the extractor to move to the right. Pushing of pushbutton 124 energizes the latching coil 120b to close the contacts 117 and open the contacts 118. This isolates the reverse circuit block 111 and energizes the forward circuit block 110 for operating the vertical driving motor 62 and the extractor motor 74. Operation of the horizontal driving motor 49 is not necessary for this sequence since no movement of the horizontally movable carriage 45 and associated mast structure 48 is needed at this time. Closing of the pushbutton switch 124 also momentarily energizes latching coil 133 which is connected in parallel with latching coil 120b by line 128. Coil 133 closes contacts 133a in line 134 thereby completing a circuit from the forward circuit block 110 through line 134, contacts 133a, contacts 132a of the selector switch 132 and coil 130 to lead L2'. The direction coil 130 causes the extractor to move to the right. After the extractor is fully extended into the P and D station 19, the forward selector circuits 110 cause the extractor initially in its lowered position, to rise, thereby lifting the load off the support members of the P and D station 19, while at the same time momentarily closing crossover switch 127. Closing of the crossover switch energizes the unlatching coil 121 thereby opening contacts 117 and closing contacts 118 to energize reverse circuit block 111 and cause reversal of the aforedescribed movements of the extractor and elevator to move the load onto the load carrier preparatory to moving it to the selected storage bin in the storage frame. Reference may be had to Pat. 3,219,207 for a more detailed discussion of the aforedescribed load carrier operation.

Now if the load being moved from the selected P and D station 19 toward the aisle 15, or in other words, with the reverse circuit block 111 energized, is excessively high and breaks the light beam Z' (FIG. 4) from light source 97 to the photoelectric cell 94 of sensor mechanism 86', the excessively high load will be rejected in the following manner. The photoelectric cell 94 (for P and D station 19) and photoelectric cell 94' (for P and D station 19a) have control contacts 94a and 94a' respectively (FIG. 8) which are connected in parallel with the pushbutton 124. These contacts are normally closed and are held open by the effect of the light beams from the respective light sources 97 and 97'. Therefore, when an excessively high load supported on the exterior and coming from P and D station 19 breaks the light beam Z' the contacts 94a close, thereby reenergizing the latching coil 120b and coil 133. Contacts 117 again close while contacts 118 open, and coil 130 is again energized by closing of the contacts 133a (line 134). The extractor is consqeuently caused to move outwardly by the forward selector circuits 110 and thus moves the load back onto the P and D station 19. Once the extractor is fully extended into the P and D station 19, the extractor automatically lowers thereby redepositing the over-height load at the P and D station and at the same time momentarily closing the crossover switch 127. Closing of the crossover switch 127 again energizes the unlatching coils 121, 135 whereby the contacts 133a and 117 again open and contacts 118 again close. The reverse circuit block 111 is thus energized and causes the extractor in its lowered position to move to the left back into the elevator. The operator can then see to the removal of the over-height load from the P and D station.

If the load, picked up at the P and D station 19, is low enough to pass safely under light beam Z', the load carrier will return to the start position with the load resting on the extractor and by means of selector switches on the console 91, an operator may select a proper height load support bin at which he desires to deposit the load in the associated storage section 10, 10a, and as described for instance in U.S. Pat. 3,219,207.

If the load being removed brom the respective P and D station is of such height so as to break for instance the light beam Y', but not the light beam Z', then the photocell contacts 93b, 92b or 93b', 92b' (FIG. 8) of respectively photoelectric cells 93, 92 and 93', 92' will be affected. Contacts 93b, 93b' are normally closed contacts which are maintained open by light beam Y' from the respective light source 96 or 96'. If the load removed from the P and D station by the extractor breaks the light beam X' but not the light beam Y', then contacts 92b or 92b' of respective photoelectric cells 92, 92' will be affected. Contacts 92b, 92b' are normally closed contacts which are maintained open by the light beam from the associated light source 95 or 95'.

Now assume that a load designated for a load level L1, L2 or L3 in the storage frame is being transferred from the P and D station 19 onto the carrier and is of such height as to break the light beam X'. Then photoelectric contacts 92b would close thereby energizing latch relay coil 92c. Energization of latch coil 92c would open the normally closed contacts 92c" in line 144 and thus isolate the extractor direction coil 130. When the operator sends the load carrier down the aisle with the load by actuation of pushbutton 122 to thereby energize the forward selector circuits, and to the selected storage bin level (e.g. L1, L2 or L3) the extractor motor can not be energized due to the open condition of relay contacts 92c". Accordingly, the extractor will not move to place the load in the selected bin level of the right-hand storage frame section. However, the timer coil 143 will be energized due to the closed condition of contacts 130a and 131a. Timer coil 143 controls timer switch 146 which is connected in parallel with crossover switch 127. Timer switch 146 closes a predetermined time after the timer coil 143 is energized and closing of the timer switch 146 energizes the unlatching coil 121, thereby opening relay contacts 117, deenergizing forward selector circuit block 110, and closing relay contacts 118, to cause energization of the reverse circuit block 111 and thus causing return of the load carrier to start position between the P and D stations. In this connection, contacts 117 and 120a" may be overlapping contacts so that relay contacts 120a" close just prior to opening of contacts 117, thus permitting energization of unlatching relay 92c' and closure of contacts 92c" just prior to deenergization of forward selector circuit block 110, thus cancelling the memory of latch relay 92c.

After return of the load carrier with the over-height load to the start position as aforedescribed, the operator may actuate pushbutton 124 to place the over-height load back on the P and D station where it can be returned back via the spur conveyor mechanism 30 to the main conveyor for transference to another storage frame section having the right height of bins for that height of load. Normally closed pushbutton switch 100 may be provided for opening by the operator and thus isolating of the latch relay coils 92c and 93c during return of the over-height load to the P and D station, for preventing deenergization of the extractor motor actuating relay coils 130, 131 during the return of the load to the P and D station. The operator may then reclose switch 100.

If a load designated for a load level M1, M2 or M3 in the storage frame is being transferred from the P and D station 19 onto the load carrier and the height of such load is such as to break the light beam Y', then normally closed photoelectric contacts 93b, 92b would close thereby energizing latch relays 93c and 92c. Energization of relay coils 93c and energization of latch relay 92c opens normally closed relay contacts 93c" in line 147 and contacts 92c" in line 144. Accordingly, even though at bin level M1 or M2 the switch 112 is closed by an associated trip 112' on the mast 48 (FIG. 5) the extractor coil 130 (for moving the extractor to the right) is isolated. Accordingly when the operator sends the load carrier down the aisle to the selected storage bin at the selected level (either M1, M2 or M3), the extractor motor cannot be energized due to the open condition of contacts 92c" and 93c". Accordingly, the extractor will not move to place the medium size load in the selected bin of the right-hand storage section. However, the timer coil 143 will be energized as before described and the load carrier will return with the over-height load to start position. Upon return the unlatch coils 93c' and 92c' will be energized as aforedescribed, and contacts 92c" and 93c" will be closed to once again place the extractor coils 130, 131 in circuit with the forward selector circuit block 110. The operator by pressing buttons 124 and 100 may then return the overheight load to the P and D station.

It will be understood that all loads above a maximum height are sensed and rejected at the P and D station by photoelectric cells 94 or 94′, as aforedescribed. Accordingly, if a high load is properly directed to level H, the limit switch 113 in line 145 will close to complete a circuit across the line 134 to extractor coils 130 or 131. The high load will then be moved into the selected storage frame section at level H, with the empty load carrier returning to the start position as in any normal cycle of operation.

As diagrammatically illustrated at 101 in FIG. 8, extensible line means, such as for instance festoon cable, may be used to connect the photocell contacts 92b, 92b′, 93b, 93b′, 94a and 94a′ into the warehousing circuit, for movement of the load carrier with respect to the stationary photocell sensors of sensor means 86, 86′.

From the foregoing description and accompanying drawings, it will be seen that the invention provides a transfer mechanism in an automatic storage system having sensing means coacting with the system for preventing over-height loads from moving into the system and providing for transmittal of over-height loads from selected storage areas in the system to other locations in the system or removal from the system.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

What is claimed is:

1. In an automatic warehousing system including a storage means, said storage means comprising a plurality of generally parallel extending laterally spaced travel zones with horizontally and vertically arranged storage bins disposed on at least one side of each travel zone, load carrier means movable along side the storage bins for depositing loads into and removing loads from said storage bins, a pickup and discharge station located adjacent the entry end of each of said travel zones, power driven conveyor means for delivering to said load carrier means loads to be stored, said conveyor means comprising a main conveyor section having a plurality of spaced transfer stations thereon and a spur conveyor section extending between each transfer station and the respective pickup and discharge station, said load carrier means being operative to pick up loads at the associated pickup and discharge station and deposit the loads in selected storage bins of the associated travel zone and to withdraw loads from the selected storage bins in the associated travel zone and return them to the associated pickup and discharge station, control means for said conveyor means and said load carrier means, and sensing means operatively coupled to said control means and coacting with said conveyor means and said load carrier means, said sensing means being operative to check the size of loads being moved into the system and to prevent attempted handling of oversized loads in the system, said sensing means including a sensor coacting with said main conveyor section upstream from said transfer stations for sensing a maximum size of load movable into said system on said main conveyor section, said sensing means also including a sensor located at each of said transfer stations for sensing the size of a load prior to transfer of the latter to the respective spur conveyor section, each of said transfer station sensors being disposed at a sensing height relative to the maximum height of the loads being stored, and said sensing means also including a plurality of vertically spaced sensors at at least one of said pickup and discharge stations and spaced from said load carrier means, said pickup and discharge station sensors each being responsive to a load at the associated pickup and discharge station exceeding a predetermined height for preventing said load carrier means from accomplishing its operation of storing the load in the storage means.

2. A warehousing system in accordance with claim 1 wherein said load carrier means comprises a mechanized load carrier, said load carrier having an extensible extractor possessing lateral entry motion and lateral withdrawal motion for depositing loads onto and removing loads from said storage means and said associated pickup and discharge station, said control means including control elements coacting with at least one of said pickup and discharge station sensors operative to reverse said withdrawal motion of said extractor at said pick-up and discharge station and reestablish said entry motion of said extractor when said one sensor senses an oversize load.

3. A warehousing system in accordance with claim 1 wherein said load carrier means comprises a mechanized load carrier having laterally extensible transferring means for transferring a load between said load carrier and a stationary load support, said pickup and discharge station sensors being disposed laterally of the respective pickup and discharge station and being responsive to a load exceeding a predetermined height being moved by said transferring means between said respective pickup and discharge station and said load carrier, to cause stopping of said transferring means.

4. A warehousing system in accordance with claim 1 wherein said storage means is adapted to receive loads therein of different heights, said pickup and discharge station sensors comprising vertically spaced photocell sensors disposed at heights corresponding generally to the maximum heights of loads adapted to be supported by the respective storage bins of said storage means.

5. A warehousing system in accordance with claim 3 wherein the uppermost of said sensors at said respective pickup and discharge station upon sensing an overheight load at the respective station being adapted to cause actuation of said transferring means to return the load to said respective pickup and discharge station prior to movement of said load carrier away from said respective pickup and discharge station, the other of said sensors at said respective pickup and discharge station, upon sensing an overheight load at said station being operable to prevent actuation of said transferring means for depositing the load by said load carrier in said storage means after movement of said load carrier away from said respective pickup and discharge station.

6. A warehousing system in accordance with claim 1 wherein each of said spur conveyor sections includes movable load handling means capable of lifting a load from or depositing a load at the respective transfer station, an extendible and retractable stop mounted at each transfer station so as when extended to stop a load moving along said main conveyor section, said control means including control elements causing said stop to extend and retract and causing said spur conveyor section to retrieve a load at the respective transfer station and move it toward said storage means, said sensor at the respective transfer station being in circuit with said control elements controlling said retrieval operation of said load handling means at said respective transfer station, whereby said load handling means is deenergized when the last mentioned sensor senses an over-height load.

7. A warehousing system in accordance with claim 1 wherein said load carrier means comprises a mechanized load carrier including a load transferring laterally extendible extractor, said transfer station sensors being progressively elevated with respect to said main conveyor section in the downstream direction of said main conveyor section, and being operative for preventing transfer movement of an oversized load onto the respective spur conveyor section, said associated pickup and discharge station being adapted to receive said extractor for picking up a load at the last mentioned pickup and discharge staiton, said extractor being adapted to move with a load generally horizontally past said pickup and discharge station sensors during movement of the load by said extractor from said associated pickup and discharge station onto said load carrier, for checking the load size, the last mentioned sensors being operative to prevent movement by said load carrier of an oversized load onto said storage means.

8. A warehousing system in accordance with claim 1 wherein said load carrier means comprises a mechanized load carrier and wherein there is provided a pair of pick-up and discharge stations disposed on opposite sides of the horizontal path of movement of said load carrier, one of said pick-up and discharge stations coacting with said spur conveyor section for receiving loads from said main conveyor section, the other of said pick-up and discharge stations being remote from said spur conveyor section, both of said pick-up and discharge stations having sensing means coacting therewith for sensing the height of loads thereon.

9. A warehousing system in accordance with claim 6 wherein said control means includes control element means operable to cause retraction of said stop after sensing of an over height load by said last mentioned sensor, and to cause energization of said main conveyor section, whereby the over height load is moved away from said transfer station.

10. A warehousing system in accordance with claim 1 wherein each of said sensors comprises a photoelectric cell and associated light source.

11. A warehousing system in accordance with claim 1 wherein said control means includes electric power means for driving said main conveyor section, each of said transfer station sensors comprising a photoelectric cell and an associated light source, said cell being effective to deenergize said power means upon interruption of said light source by an oversized load at the respective transfer station.

12. A warehousing system in accordance with claim 7 wherein said extractor possesses a loading movement at said pick-up and discharge station comprising generally horizontal forward entry motion of said extractor into the pick-up and discharge station in a low position and then rising slightly to pick-up a load positioned on said pick-up and discharge station after which the extractor moves in a generally horizontal withdrawal motion back toward the load carrier, said last mentioned sensors comprising a photoelectric cell and associated light beam, with interruption of said light beam by an oversize load causing reversal of said withdrawal motion of said extractor and redepositing of the load on said pick-up and discharge station.

References Cited

UNITED STATES PATENTS

| 2,033,645 | 3/1936 | Parkhill | 209—82.1 |
| 2,063,485 | 12/1936 | Carris | 250—223 XR |
| 2,740,521 | 4/1956 | Calvin | 209—82 |
| 3,182,823 | 5/1965 | Chasar. | |
| 3,219,207 | 11/1965 | Chasar. | |
| 3,321,063 | 5/1967 | Blume | 198—38 |
| 3,365,699 | 1/1968 | Foster | 250—223 XR |

FOREIGN PATENTS

| 847,658 | 9/1960 | Great Britain. |

GERALD M. FORLENZA, Primary Examiner

R. B. JOHNSON, Assistant Examiner

U.S. Cl. X.R.

209—82